(12) United States Patent
Shikanai et al.

(10) Patent No.: US 10,220,905 B2
(45) Date of Patent: Mar. 5, 2019

(54) HANDLE WEIGHT MOUNTING STRUCTURE OF STRADDLE-TYPE VEHICLE

(71) Applicant: HONDA MOTOR CO., LTD., Tokyo (JP)

(72) Inventors: Shimpei Shikanai, Saitama (JP); Kazuhiko Gogo, Saitama (JP); Hideki Hayashi, Saitama (JP); Takeo Nakazawa, Saitama (JP); Makoto Nishioka, Saitama (JP); Hikaru Yokomura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 70 days.

(21) Appl. No.: 15/232,203

(22) Filed: Aug. 9, 2016

(65) Prior Publication Data

US 2017/0050695 A1 Feb. 23, 2017

(30) Foreign Application Priority Data

Aug. 20, 2015 (JP) ................................ 2015-162569

(51) Int. Cl.
*B62K 21/14* (2006.01)
*B62K 11/14* (2006.01)
*B62K 21/12* (2006.01)
*B62J 23/00* (2006.01)
*B62K 21/26* (2006.01)

(52) U.S. Cl.
CPC .............. *B62K 11/14* (2013.01); *B62J 23/00* (2013.01); *B62K 21/12* (2013.01); *B62K 21/14* (2013.01); *B62K 21/26* (2013.01)

(58) Field of Classification Search
CPC ........ B62K 11/14; B62K 21/12; B62K 21/14; B62K 21/26; B62J 23/00
See application file for complete search history.

(56) References Cited

U.S. PATENT DOCUMENTS

| 7,676,890 | B2 * | 3/2010 | Zhang | B25F 5/006 16/421 |
|---|---|---|---|---|
| 8,141,209 | B2 * | 3/2012 | Zhang | B25F 5/006 16/421 |
| 2008/0235913 | A1 * | 10/2008 | Eicher | B25F 5/006 16/430 |
| 2012/0304805 | A1 * | 12/2012 | Higashijima | B62K 11/14 74/551.8 |

FOREIGN PATENT DOCUMENTS

| JP | 2003081168 A | * 3/2003 | ............. B62K 11/14 |
|---|---|---|---|
| JP | 2012-250589 A | 12/2012 | |

* cited by examiner

*Primary Examiner* — Vicky A Johnson
(74) *Attorney, Agent, or Firm* — Birch, Stewart, Kolasch & Birch, LLP

(57) ABSTRACT

A handle weight mounting structure of a straddle-type vehicle which achieves a simple structure and thereby enables a reduction of variation in the vibration isolating performance and a cost reduction. A fastening bolt includes a shank portion in which an external thread portion to be screwed and joined to the inner face of a handle pipe is formed; and a head portion which is formed on an end part of the shank portion for pressing the outer weight in the axial direction of the handle pipe, the shank portion includes a lock portion which is designed to couple the outer weight and the inner weight to each other. The lock portion is provided on an end part of the external thread portion opposite from the head portion.

11 Claims, 6 Drawing Sheets

HANDLE WEIGHT MOUNTING STRUCTURE OF STRADDLE-TYPE VEHICLE

CROSS-REFERENCE TO RELATED APPLICATIONS

The present application claims priority under 35 USC 119 to Japanese Patent Application No. 2015-162569 filed Aug. 20, 2015 the entire contents of which are hereby incorporated by reference.

BACKGROUND OF THE INVENTION

1. Field of the Invention

The present invention relates to a handle weight mounting structure for a straddle-type vehicle.

2. Description of Background Art

Heretofore, there has been known a handle weight mounting structure of a straddle-type vehicle in which an outer weight is supported in an immovable state (rigidly supported) on a handle pipe with a weight mounting bolt and a tapered-shaped nut member. An inner weight is supported in a floating state (supported in a floating fashion) inside the handle pipe. See, for example, Japanese Patent Application Publication No. 2012-250589.

Since Japanese Patent Application Publication No. 2012-250589 has in the handle pipe a large number of components constituting the handle weight, variation in the vibration isolating performance is likely to occur once the weight mounting bolt has been fastened. It is desirable to reduce the variation in the vibration isolating performance. In addition, since the structure of Japanese Patent Application Publication No. 2012-250589 is one in which an outer weight fitting portion is expanded radially by the fastening of the weight mounting bolt and thereby pressed against the inner face of the handle pipe, the inner diameter of the handle pipe and the outer weight fitting portion need to be made particularly precisely. Thus, this structure is expensive.

SUMMARY AND OBJECTS OF THE INVENTION

An objective of an embodiment of the present invention is to provide a handle weight mounting structure of a straddle-type vehicle which achieves a simple structure and thereby enables a reduction in the variation in the vibration isolating performance. In addition, a reduction in the cost is achieved.

In order to solve the above problem, according to an embodiment of the present invention in a handle weight mounting structure of a straddle-type vehicle including a handle pipe (14); and a handle weight (61) which is supported by the handle pipe (14) and configured to reduce vibrations of the handle pipe (14), the handle weight (61) includes an outer weight (62) which is provided on an end part of the handle pipe (14) with an inner weight (66) which is supported inside the handle pipe (14) via a rubber member (68). A fastening bolt (63) is provided to penetrate the outer weight (62) for fixing the outer weight (62) to the handle pipe (14). The fastening bolt (63) includes a shank portion (63a) in which an external thread portion (63c) to be screwed and joined to an inner face of the handle pipe (14) is formed; and a head portion (63b) which is formed on an end part of the shank portion (63a) for pressing the outer weight (62) in an axial direction of the handle pipe (14). The shank portion (63a) includes a lock portion (63f) which is designed to couple the outer weight (62) and the inner weight (66) to each other. In addition, the lock portion (63f) is provided on an end part of the external thread portion (63c) opposite from the head portion (63b).

In the above configuration, the structure may be configured so that an outer diameter (D2, D3) of the shank portion (63a) of the fastening bolt (63) on a side thereof close to the head portion (63b) is smaller than an outer diameter (D1) of the external thread portion (63c) of the shank portion (63a), and a space (73, 74) is defined between the shank portion (63a) and the outer weight (62).

According to an embodiment of the present invention, the structure may be configured so that an outer diameter (D4) of the head portion (63b) is formed larger than an outer diameter (PD) of the handle pipe (14), and the head portion (63b) is screwed and joined to the handle pipe (14) while being brought in contact with an end part of the outer weight (62) and an end part a knuckle guard (25) which is designed to cover, from the front, a grip (24, 41) provided on the handle pipe (14).

According to an embodiment of the present invention, the structure may be configured so that the lock portion (63f) includes a notch portion (63k) formed in the shank portion (63a), and a width (W) of the notch portion (63k) in an axial direction thereof is three times or more a thickness (T) of an insertion portion (64a) which is formed in a coupling member (64) for being inserted in the notch portion (63k), the coupling member being designed to couple the fastening bolt (63) and the inner weight (66) to each other.

According to an embodiment of the present invention, the shank portion includes an external thread portion to be screwed and joined to the inner face of the handle pipe. The head portion is formed on the end part of the shank portion for pressing the outer weight in the axial direction of the handle pipe. The shank portion includes the lock portion which is designed to couple the outer weight and the inner weight to each other, and the lock portion is provided on the end part of the external thread portion opposite from the head portion. Thus, it is no longer necessary that the tapered-shaped nut member as in the existing structure be provided inside the handle pipe. Accordingly, the handle weight can have a simple structure with a small number of components. This reduces variation in the vibration isolating performance and enables an inexpensive structure.

According to an embodiment of the present invention, the shank portion of the fastening bolt has a structure such that its outer diameter is partially smaller than the nominal diameter/effective diameter of the external thread portion of the shank portion. Thereby, the amount of elongation of the fastening bolt with respect to a predetermined fastening torque can be increased. By increasing the amount of elongation of the fastening bolt, the loosening of the fastening bolt can be prevented.

According to an embodiment of the present invention, the outer diameter of the head portion is formed larger than the outer diameter of the handle pipe, and the head portion is screwed and joined to the handle pipe while being brought in contact with the end part of the outer weight and the end part the knuckle guard which is designed to cover, from the front, the grip provided on the handle pipe. Since the outer diameter of the head portion of the fastening bolt is formed large in this manner, no washer is needed. Accordingly, it is possible to reduce the number of components, and thus reduce the variation in the vibration isolating performance while reducing cost.

According to an embodiment of the present invention, the lock portion includes the notch portion formed in the shank portion, and the width of the notch portion in its axial direction is three times or more the thickness of the insertion portion which is formed in the coupling member for being inserted in the notch portion, the coupling member being designed to couple the fastening bolt and the inner weight to each other. Since this lock portion is formed in the fastening bolt, the width of the notch portion for defining the lock portion can be increased. Accordingly, the thickness of a cutting tool for forming the notch portion can be increased and thus the cost of the cutting tool can be reduced. As a result, the handle weight can be made at low cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 6(A) to 6(C) are explanatory views illustrating a coupling member, in which FIG. 6(A) is a perspective view of the coupling member, FIG. 6(B) is a side view of the coupling member, and FIG. 6(C) is a view illustrating the coupling member of FIG. 6(B) as seen in a direction indicated by an arrow C.

DETAILED DESCRIPTION OF THE PREFERRED EMBODIMENTS

Hereinbelow, an embodiment of the present invention is described with reference to the drawings. Note that, throughout the description, directional terms such as front, rear, left, right, up, and down are identical to those directions in relation to a vehicle body, unless otherwise noted. In addition, throughout the drawings, FR represents the front side of the vehicle body, UP represents the upper side of the vehicle body, and LH represents the left side of the vehicle body.

Figure 1:
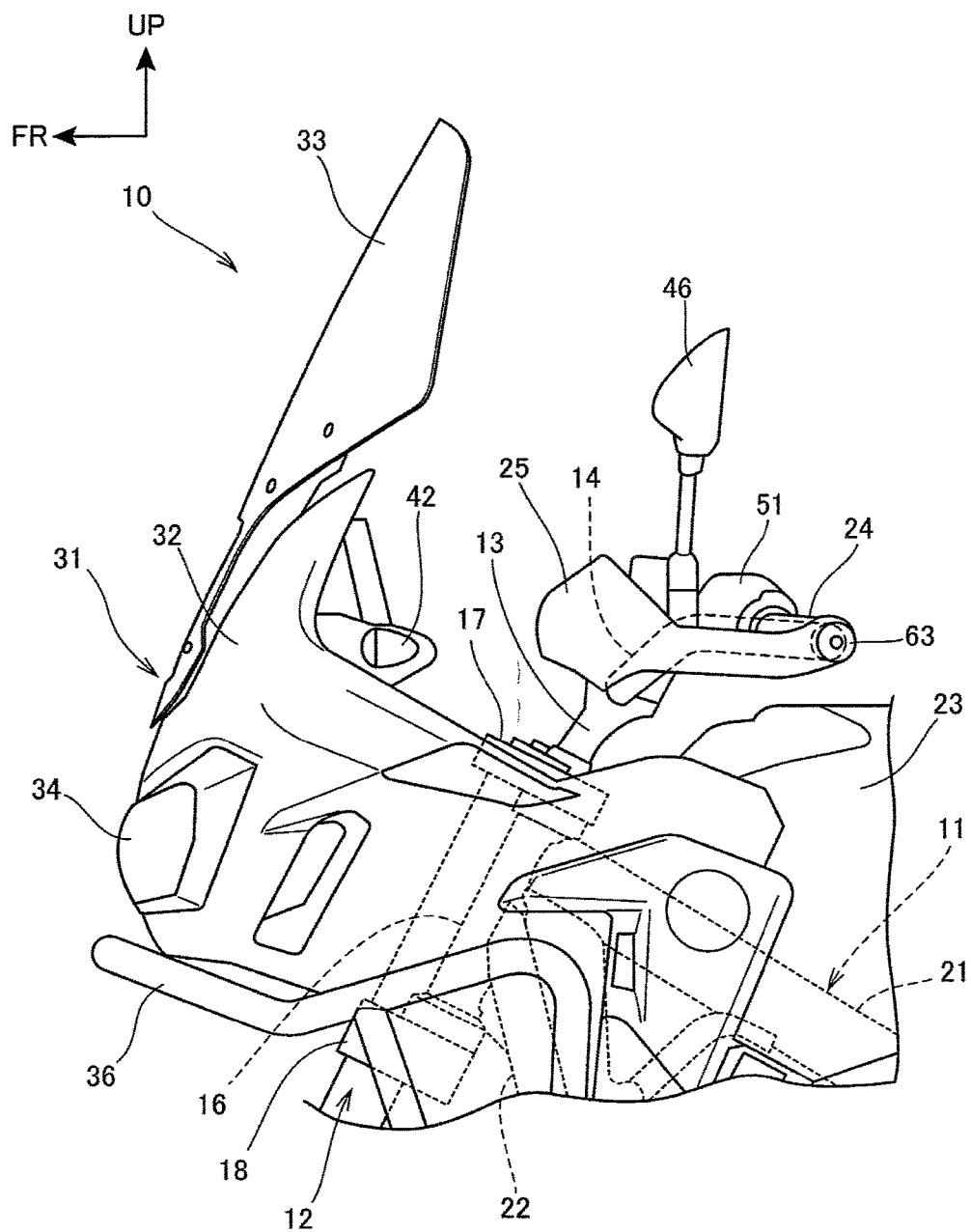
FIG. 1 is a left side view of a main part of a motorcycle having a handle weight mounting structure according to the present invention.

FIG. 1 is a left side view of a main part of a motorcycle 10 having a handle weight mounting structure according to the present invention.

The motorcycle 10 is a straddle-type vehicle in which a pair of front forks 12 is steerably supported on a front end part of a body frame 11 with a handle pipe 14 being mounted on upper parts of the front forks 12 via a handle bracket 13. A front wheel is supported by the lower parts of the front forks 12.

The pair of front forks 12 is swingably supported on a head pipe 16 which constitutes the front end part of the body frame 11, the left and right upper parts of the front forks 12 are coupled together by a top bridge 17, and left and right intermediate parts of the front forks 12 in a vertical direction are coupled together by a bottom bridge 18.

A pair of left and right main frames 21 extends rearwardly and downwardly from a rear upper part of the head pipe 16, and a down frame 22 extends rearwardly and downwardly from a rear lower part of the head pipe 16 at a position below the left and right main frames 21. A fuel tank 23 is provided on upper parts of the left and right main frames 21.

The handle pipe 14 is provided with a handle grip 24 at its one end part. An end part of a knuckle guard 25 is designed to cover the handle grip 24 from the front is mounted on the end part of the handle pipe 14.

A front part of the motorcycle 10 with respect to the vehicle body is covered with a body cover 31. The body cover 31 includes a front cover 32 for covering a front part and left and right side parts of the pair of front forks 12. A windshield 33 is provided on a front upper part of the front cover 32. A headlight 34 is provided on a front face of the front cover 32. A front guard member 36 covers a lower part of the front cover 32 from its front and lateral sides.

Figure 2:
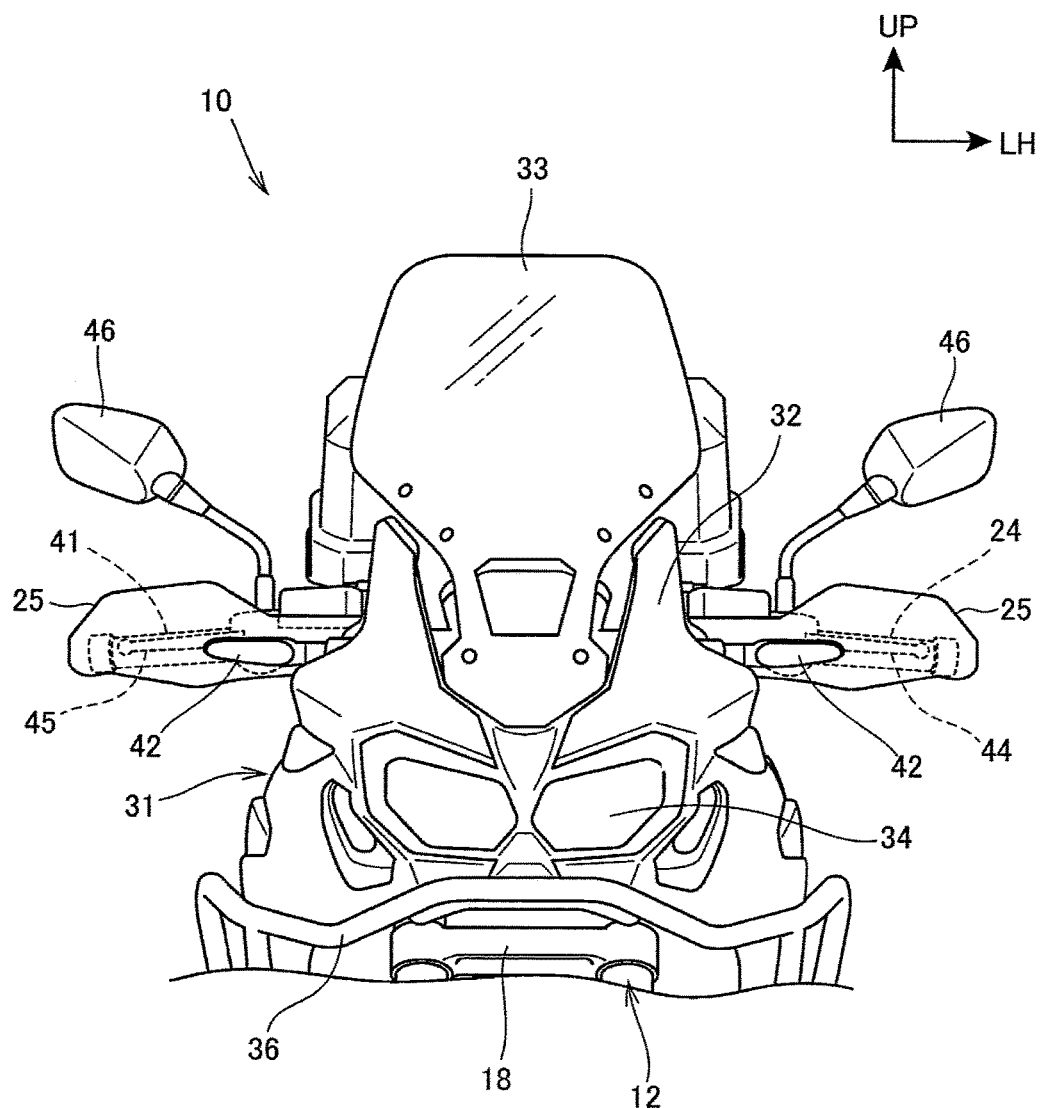
FIG. 2 is a front view illustrating the main part of the motorcycle.

FIG. 2 is a front view illustrating the main part of the motorcycle 10.

The handle pipe 14 (see FIG. 1) is provided with the handle grip 24 at its left end part and a throttle grip 41 at its right end part. The handle grip 24 and the throttle grip 41 are respectively covered from the front with knuckle guards 25 mounted on the end parts of the handle pipe 14. A pair of left and right front indicators 42, 42 mounted on the body cover 31 is disposed ahead of the knuckle guards 25, 25.

A clutch lever 44 which is located in front of the handle grip 24 with a front brake lever 45 being located in front of the throttle grip 41, and a pair of left and right rearview mirrors 46, 46 are mounted on the handle pipe 14.

The knuckle guards 25, 25 also respectively cover the clutch lever 44 and the front brake lever 45 from the front.

Figure 3:
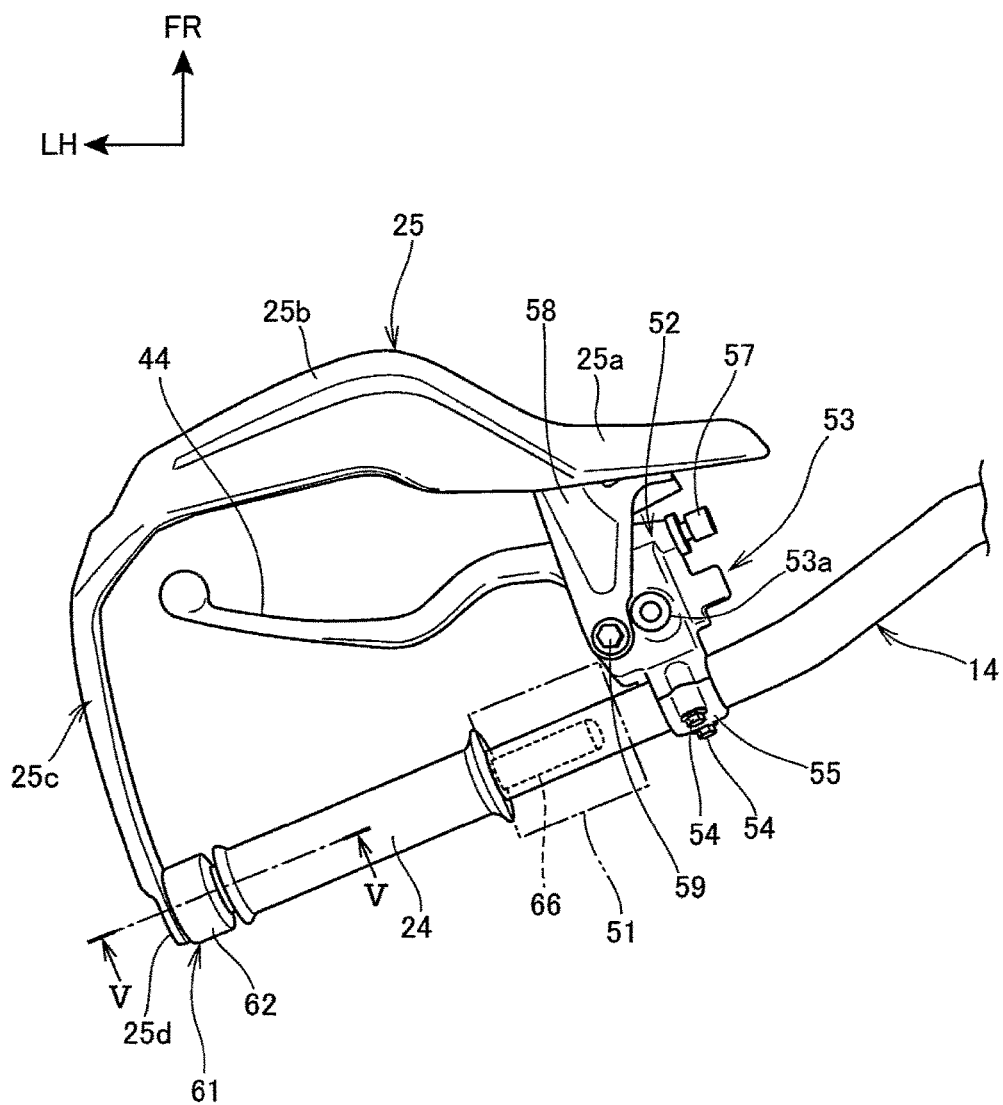
FIG. 3 is a plan view illustrating one end part of a handle pipe.

FIG. 3 is a plan view illustrating the one end part of the handle pipe 14.

The handle pipe 14 is provided at the one end part with a switch housing 51 which abuts on an inner part of the handle grip 24 in the vehicle widthwise direction and a lever holder 52 which is disposed inwardly of the switch housing 51 in the vehicle widthwise direction.

The switch housing 51 has multiple switches configured to turn on or off electrical units, lighting devices, and the like included in the motorcycle 10 (see FIG. 1). The lever holder 52 is formed from a holder body 53 which is designed to swingably support the clutch lever 44 and a holder piece 55 which pinches the handle pipe 14 between itself and a rear part of the holder body 53 and is screwed and joined to the holder body 53 with multiple bolts 54.

A cable coupling member 57 to which an end part of a clutch cable is coupled is screwed and joined to the holder body 53, and a mirror boss portion 53a in which the lower end of the rearview mirror 46 (see FIG. 1) is screwed is formed in the holder body.

More specifically, the cable coupling member 57 supports an outer cable of the clutch cable, and a tip part of an inner wire slidably inserted in the outer cable of the clutch cable is coupled to the clutch lever 44.

A guard support member 58 supporting the knuckle guard 25 at its inner part in the vehicle widthwise direction is mounted on the holder body 53 with a bolt 59. The bolt 59 also functions as the turning shaft of the clutch lever 44.

The knuckle guard 25 is formed from an inner fixation portion 25a; a front guard portion 25b and an outer guard portion 25c.

The inner fixation portion 25a is mounted on a front end part of the guard support member 58 with a fixation member. The front guard portion 25b extends outwardly in the vehicle widthwise direction continuously from the inner fixation portion 25a, is disposed in front of the handle grip 24 and the clutch lever 44, and bulges forward. The outer guard portion 25c extends rearwardly from an outer end part in the vehicle widthwise direction of the front guard portion 25b to be connected to the end part of the handle pipe 14, and the outer guard portion 25c includes at its rear end part an outer fixation portion 25d mounted on the handle pipe 14. The outer fixation portion 25d is mounted on the end part of the handle pipe 14 together with an end part of a handle weight 61 configured to reduce vibrations of the handle pipe 14.

Figure 4:
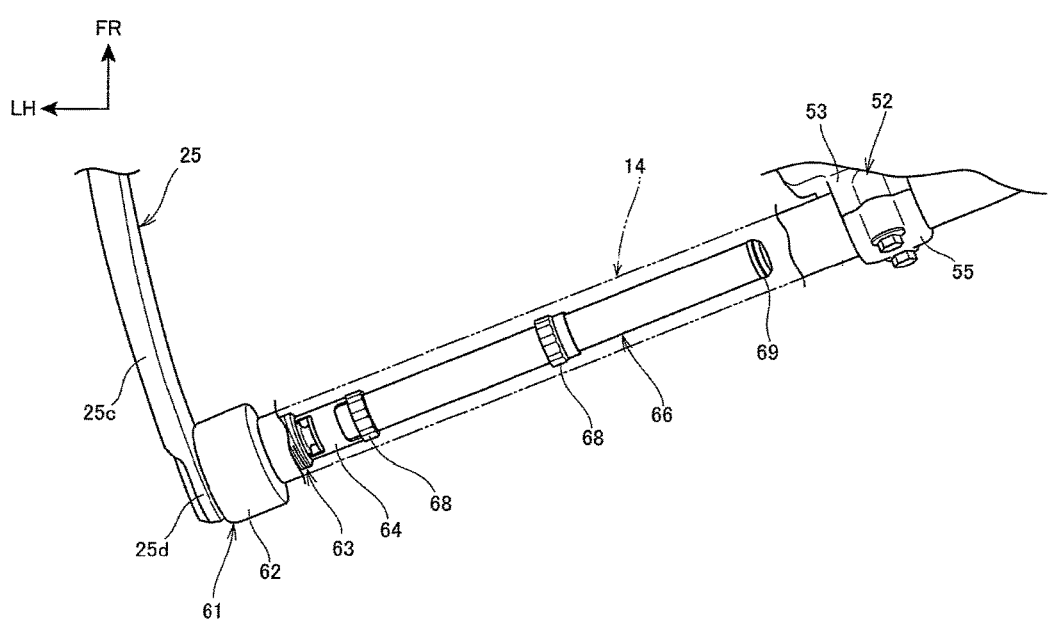
FIG. 4 is a main part plan view illustrating a handle weight provided in the handle pipe.

FIG. 4 is a main part plan view illustrating the handle weight 61 provided in the handle pipe 14.

The handle weight 61 includes an outer weight 62 which is provided on the end part of the handle pipe 14 with a fastening bolt 63 which fastens the outer weight 62 to the end part of the handle pipe 14 together with the knuckle guard 25. An inner weight 66 is coupled to the fastening bolt 63 via a coupling member 64 and whose entire body is disposed inside the handle pipe 14.

The outer weight 62 is made of steel, for example, integrally supported (rigidly supported) on the handle pipe 14, and configured to reduce vibrations of the handle pipe 14 by changing the resonance frequency of the handle pipe 14.

The fastening bolt 63 is screwed and joined to the end part of the handle pipe 14.

The coupling member 64 has one end coupled to the fastening bolt 63 and the other end coupled to the inner weight 66 via first rubber parts 68 to be described in detail later.

The inner weight 66 is made of brass, for example, and has one end part and an intermediate part on which the first rubber parts 68 as elastic bodies are respectively fitted and the other end part on which a second rubber part 69 as an elastic body is fitted. More specifically, annular grooves are formed in both end parts and the intermediate part of the inner weight 66, and inner circumferential faces of the first rubber parts 68, 68 and the second rubber part 69 are respectively fitted in these annular grooves.

As described above, the inner weight 66 is supported (supported in a floating state) by the handle pipe 14 via the first rubber parts 68, 68.

The inner weight 66 is a dynamic damper configured to reduce vibrations of the handle pipe 14 by absorbing the work, done by the vibrations of the handle pipe 14 (main vibration system), as the vibrations of the inner weight 66 (sub-vibration system).

The first rubber parts 68 are coupled to the coupling member 64 by press fitting their maximum outer diameter parts into the inner circumferential face of the handle pipe 14 and locking the first rubber part 68 on one end part side of the inner weight 66 to the coupling member 64.

The second rubber part 69 has a clearance with the inner circumferential face of the handle pipe 14. For example, when the handle pipe 14 is displaced by application of an impact or the like on the handle pipe, the second rubber part 69 hits against the inner face of the handle pipe 14 and thereby prevents the inner weight 66 from directly interfering with the inner face of the handle pipe 14.

Figure 5:
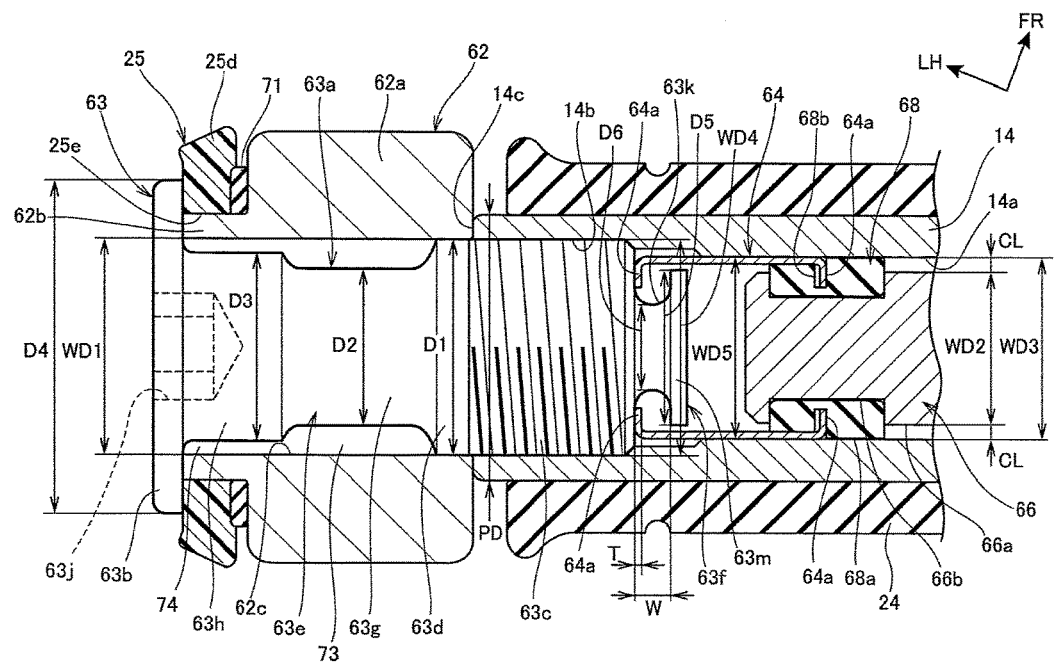
FIG. 5 is a sectional view taken along a line V-V in FIG. 3.

FIG. 5 is a sectional view taken along a line V-V in FIG. 3.

The handle pipe 14 has an internal thread portion 14b formed in an inner circumferential face 14a of its end part.

The fastening bolt 63 is formed from a substantially columnar shank portion 63a with a disc-shaped head portion 63b being formed integrally on one end part of the shank portion 63a.

The shank portion 63a includes an external thread portion 63c; a base portion 63d with a thin shank portion 63e and a lock portion 63f.

The external thread portion 63c is formed on the other end part side of the shank portion 63a, and is screwed and joined to the internal thread portion 14b of the handle pipe 14. The base portion 63d is formed in a columnar shape having an outer diameter equal to or substantially equal to the outer diameter (nominal diameter) or effective diameter of the external thread portion 63c. The thin shank portion 63e abuts on one side of the base portion 63d close to the head portion 63b, is formed to have a diameter smaller than the base portion 63d, and is formed from a first thin shank portion 63g which is provided close to the base portion 63d and a second thin shank portion 63h which is provided at one side of the first thin shank portion 63g close to the head portion 63b and formed to have a diameter larger than the first think shank portion 63g. The base portion 63d does not necessarily have to have a columnar shape and may be a part of the external thread portion 63c instead.

Since the shank portion 63a has the thin shank portion 63e in this manner, the amount of elongation of the shank portion 63a at the time of fastening the fastening bolt 63 can be increased, which prevents the loosening of the fastening bolt 63 and improves its durability. In addition, thanks to the thin shank portion 63e, the fastening bolt 63 can be reduced in weight.

Since a hexagon socket 63j in which a hex wrench is to be inserted from the head portion 63b side is bored inside the second thin shank portion 63h, the second thin shank portion 63h has a diameter larger than the first thin shank portion 63g in order to secure the thickness of the second thin shank portion 63h.

The lock portion 63f is formed on a tip part of the external thread portion 63c. An annular groove 63k in which the coupling member 64 is to be inserted is formed in the lock portion. The annular groove 63k has a width W wherein the width is set larger than ever before. In addition, a flange portion 63m is made by the formation of the annular groove 64k. The bottom of the annular groove 63k is formed to have an arc shape in cross section.

The annular groove 63k is formed by lathe machining with a cutting tool, for example. Heretofore, an annular groove has been formed in a nut member by which a coupling member is to be locked. However, because the width of the annular groove is narrow in order to prevent a size increase of the small-diameter nut member, the thickness of a cutting tool for forming the annular groove is small. Thus, a cutting tool made of an expensive material is used in order to prevent breakage and the like of the cutting tool. The replacement cycle for worn cutting tools is short.

Against such a problem, by using the fastening bolt 63 of this embodiment as described above, a cutting tool for machining the annular groove 63k does not have to be made of an expensive material, whereby the cost can be reduced. In addition, since the bottom of the annular groove 63k has an arc shape in cross section, the tip of the cutting tool has an arc shape in cross section, whereby wear of the cutting tool can be suppressed as compared to a cutting tool having an edge portion at its tip part.

Here, D4>D1>D3>D2 is satisfied where, in the fastening bolt 63 D1 denotes the outer diameter of the base portion 63d (and the outer diameter of the external thread portion 63c); D2 denotes the outer diameter of the first thin shank portion 63g; D3 denotes the outer diameter of the second thin shank portion 63h; and D4 denotes the outer diameter of the head portion 63b. In addition, D4>PD is satisfied where PD denotes the outer diameter of the handle pipe 14.

Meanwhile, D5 denotes the outer diameter of the flange portion 63m and D6 denotes the outer diameter of the bottom of the annular groove 63k.

The outer weight 62 integrally includes a large-diameter portion 62a which is to hit against an end face 14c of the handle pipe 14 with a small-diameter portion 62b which abuts on the large-diameter portion 62a and is formed to have a diameter smaller than the large-diameter portion 62a. A rubber washer 71 and a guard mounting hole 25e bored in the outer fixation portion 25d of the knuckle guard 25 are fitted on the small-diameter portion 62b. When WD1 denotes the inner diameter of an inner circumferential face 62c of the outer weight 62, the inner diameter WD1 is set slightly larger than the outer diameter D1 of the base portion 63d of the fastening bolt 63, and the inner circumferential face 62c of the outer weight 62 is fitted on the base portion 63d of the fastening bolt 63. As a result, rattling of the outer weight 62 with respect to the fastening bolt 63 can be reduced.

When the fastening bolt 63 is fastened, an end face of the outer weight 62 on the large-diameter portion 62a side hits against the end face 14c of the handle pipe 14 whereas an end face of the outer weight 62 on the small-diameter portion 62b side hits against the head portion 63b of the fastening bolt 63. In addition, since the length of the small-diameter portion 62b in its axial direction is smaller than the thickness of combination of the outer fixation portion 25d of the knuckle guard 25 and the rubber washer 71, the washer 71 is installed while being compressed in its axial direction. Accordingly, the outer fixation portion 25d of the knuckle guard 25 is put in a state of being pressed by the head portion 63b of the fastening bolt 63. This prevents wobbling of the outer fixation portion 25d of the knuckle guard 25.

The outer weight 62 has a shorter length in its axial direction than existing ones because it has no portion to be inserted into the handle pipe 14. Accordingly, in the case of a vehicle with no knuckle guards 25, for example, the outer weight 62 can be installed while being flipped in the horizontal direction so that the end face on the small-diameter portion 62b side may hit against the end face 14c of the handle pipe 14 and the end face on the large-diameter portion 62a side may hit against the head portion 63b of the fastening bolt 63. In this way, the outer weight 62 can also be used in this case without impairing the appearance when it is installed, whereby the universality of the outer weight 62 can be improved and the cost can be reduced.

Annular spaces 73, 74 are defined between the outer weight 62 and the thin shank portion 63e (the first thin shank portion 63g and the second thin shank portion 63h) of the fastening bolt 63.

The coupling member 64 is made of a steel plate, and a pair of claw portions 64a, 64a formed to bend radially inwardly is formed in each of both end parts of the coupling member 64. The pairs of claw portions 64a, 64a at both ends of the coupling member 64 are respectively inserted into the annular groove 63k of the fastening bolt 63 and an annular groove 68b formed in an outer circumferential face 68a of the first rubber part 68, and thereby locked by the lock portion 63f and the first rubber part 68. When T denotes the thickness (plate thickness) of each claw portion 64a, the width W of the annular groove 63k described above is three times the thickness T or more.

The inner weight 66 is formed so that the outer diameter WD2 of its outer circumferential face 66a is smaller than the inner diameter WD3 of the inner circumferential face 14a of the handle pipe 14. An annular groove 66b is formed on one end side of the outer circumferential face 66a, and the first rubber part 68 is fitted in the annular groove 66b. An amount of clearance CL is formed between the inner circumferential face 14a of the handle pipe 14 and the outer circumferential face 66a of the inner weight 66.

WD5<WD3 is satisfied where WD4 denotes the inner diameter of the internal thread portion 14b of the handle pipe 14 and WD5 denotes the outer diameter of the coupling member 64 (the outer diameter of a C-shaped annular portion 64b (see FIG. 6(A)) to be described later), and the outer diameter WD5 is substantially equal to the inner diameter WD4 or smaller than the inner diameter WD4.

Figure 6A:
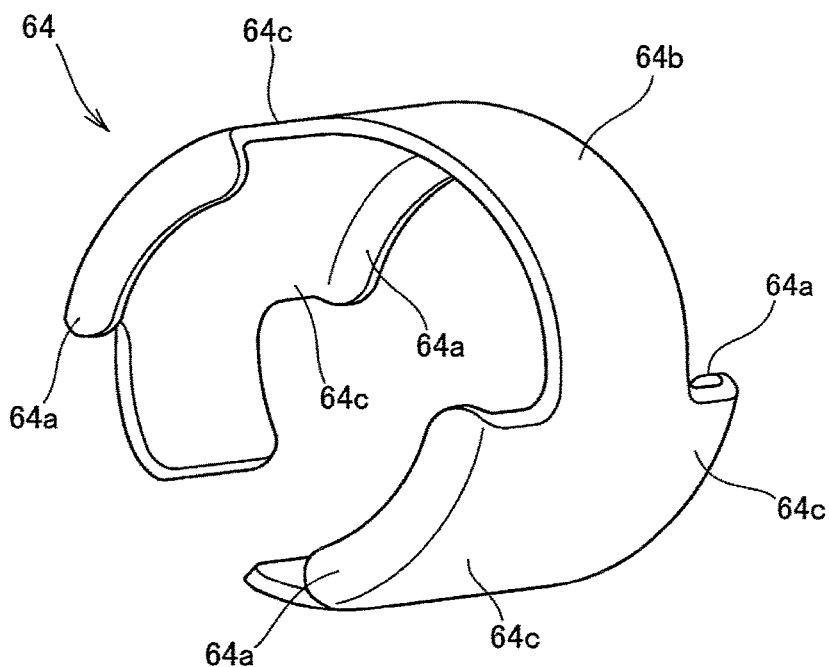
Figures 6B, 6C:
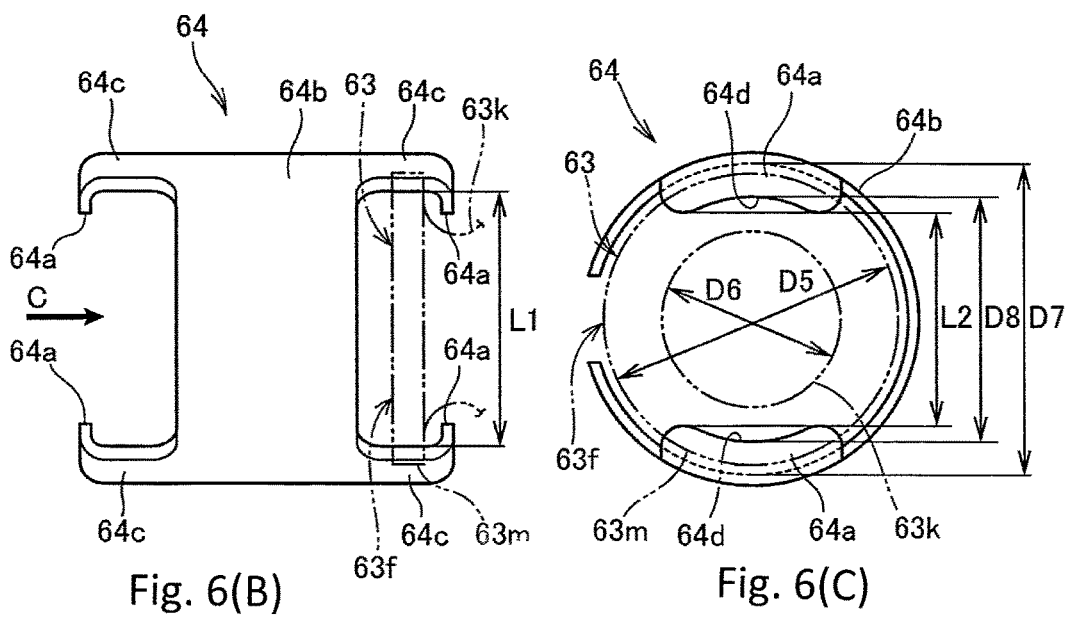

FIGS. 6(A) to 6(C) are explanatory views illustrating the coupling member 64. FIG. 6(A) is a perspective view of the coupling member 64, FIG. 6(B) is a side view of the coupling member 64, and FIG. 6(C) is a view illustrating the coupling member of FIG. 6(B) as seen in a direction indicated by an arrow C.

As illustrated in FIGS. 6(A) to 6(C), the coupling member 64 is made by integrally molding the C-shaped annular portion 64b which has a "C" shape in cross section by cutting away a part of a tube in its circumferential direction. Multiple axially extending portions 64c extend in the tube's axis direction from both end faces of the C-shaped annular portion 64b. The claw portions 64a are bent radially inwardly from the outer ends of the respective axially extending portions 64c.

In FIG. 6(B), L1 denotes the distance between the opposing pair of axially extending portions 64c, 64c. In addition, in FIG. 6(C), D7 denotes the inner diameter of the C-shaped annular portion 64b, D8 denotes the inner diameter of arc-shaped end faces 64d, 64d that the claw portions 64a, 64a respectively have at the inner side in the radial direction, and L2 denotes the distance between the opposing claw portions 64a, 64a. In the state where the coupling member 64 is locked by the lock portion 63f of the fastening bolt 63, the inner diameter D7 is larger than the outer diameter D5 of the flange portion 63m of the fastening bolt 63 (D7>D5), and the inner diameter D8 is smaller than the outer diameter D5 (D8<D5). In addition, the inner diameter D8 and the distance L2 are larger than the outer diameter D6 of the bottom of the annular groove 63k of the fastening bolt 63 (D8>D6, L2>D6). Moreover, the distance L1 between the axially extending portions 64c, 64c illustrated in FIG. 6(B) is smaller than the outer diameter D5 of the flange portion 63m (L1<D5).

Thus, the claw portions 64a, 64a are inserted into the annular groove 63k of the fastening bolt 63 by elastically deforming the coupling member 64 to enlarge the distance L1 between the pair of axially extending portions 64c, 64c and then inserting the flange portion 63m of the fastening bolt 63 into the space between these axially extending portions 64c, 64c, or alternatively by obliquely inserting the flange portion 63m into the inside of the coupling member 64 through the space between the claw portions 64a, 64a and then inserting the claw portions 64a, 64a into the annular groove 63k of the fastening bolt 63.

As illustrated in FIGS. 3, 4, and 5 above, in a handle weight mounting structure of the motorcycle 10 as a straddle-type vehicle includes the handle pipe 14 and the handle weight 61 which is supported by the handle pipe 14 and configured to reduce vibrations of the handle pipe 14. The handle weight 61 includes the outer weight 62 which is provided on the end part of the handle pipe 14 with the inner weight 66 which is supported inside the handle pipe 14 via the first rubber parts 68 as a rubber member. The fastening bolt 63 is provided to penetrate the outer weight 62 for fixing the outer weight 62 to the handle pipe 14. The fastening bolt 63 includes the shank portion 63*a* in which the external thread portion 63*c* to be screwed and joined to the inner face of the handle pipe 14 is formed. The head portion 63*b* is formed on the end part of the shank portion 63*a* for pressing the outer weight 62 in the axial direction of the handle pipe 14. The shank portion 63*a* includes the lock portion 63*f* which is designed to couple the outer weight 62 and the inner weight 66 to each other with the lock portion 63*f* being provided on the end part of the external thread portion 63*c* opposite from the head portion 63*b*.

In an existing handle weight, a tapered-shaped nut member in which one end part of an outer weight is to be inserted is provided in the handle pipe, and a tip part of a fastening bolt to penetrate the outer weight is screwed and joined to the nut member. The one end part of the outer weight is expanded radially outwardly by a tapered portion of the nut member and pressed against the inner circumferential face of the handle pipe, and thereby the outer weight is fixed to the handle pipe.

This mounting structure has a large number of components constituting the handle weight, and therefore the vibration isolating performance is likely to vary largely. In addition, since the one end part of the outer weight is inserted into the handle pipe and fixed therein while being pressed against the inner face of the handle pipe, the inner face of the handle pipe and the outer circumferential face of the one end part of the outer weight need to be machined precisely, which leads to an increase in the cost. Further, in the structure in which an inner weight is coupled to the nut member via a coupling member, when a groove to lock the coupling member is formed in an outer circumferential part of the nut member, a portion for forming the groove therein is hard to secure and thus the groove width has to be narrow in order to avoid a size increase of the nut member. If the groove width is narrow, a cutting tool for forming the groove has to be thin, and thus a cutting tool made of an expensive material is needed and the cutting tool needs to be replaced frequently in order to prevent breakage, which also leads to a cost increase.

In contrast, since the structure of this embodiment is one in which the fastening bolt 63 is screwed and joined to the inner circumferential face 14*a* of the handle pipe 14, it is no longer necessary that the tapered-shaped nut member as in the existing structure be provided inside the handle pipe 14. Accordingly, the handle weight 61 can have a simple structure with a small number of components. This reduces the variation in the vibration isolating performance of the handle weight 61 and enables the handle weight 61 to have an inexpensive structure.

In addition, unlike the existing structure, the structure of this embodiment is not one in which the tip part of the outer weight is expanded radially outwardly and pressed against the inner face of the handle pipe. Thus, the inner circumferential face 14*a* of the handle pipe 14 no longer needs to be machined precisely, whereby the cost of the handle pipe 14 can be reduced.

Further, since the lock portion 63*f* of the fastening bolt 63 is formed at the tip part of the fastening bolt 63, the width of the annular groove 63*k* of the lock portion 63*f* can be increased as compared to the case of forming the groove in the outer circumferential part of the nut member as in the existing structure. Thus, the thickness of a cutting tool for machining the annular groove 63*k* can be increased, whereby an inexpensive cutting tool can be used and thus the cost can be reduced.

Further, as illustrated in FIG. 5, the outer diameters D2, D3 of the shank portion 63*a* of the fastening bolt 63 on the side thereof close to the head portion 63*b* are smaller than the outer diameter D1 and effective diameter of the external thread portion 63*c* of the shank portion, and the spaces 73, 74 are defined between the shank portion 63*a* and the outer weight 62. Since the shank portion 63*a* has such a structure that its outer diameter is partially small in this manner, the amount of elongation of the fastening bolt 63 with respect to predetermined fastening torque can be increased, and thus the loosening of the fastening bolt 63 can be prevented. In addition, the weight of the fastening bolt 63 can be reduced.

In addition, the outer diameter D4 of the head portion 63*b* is formed larger than the outer diameter PD of the handle pipe 14, and the fastening bolt 63 is screwed and joined to the handle pipe 14 while the head portion 63*b* is brought in contact with the end part of the outer weight 62 and the end part the knuckle guard 25 which is designed to cover, from the front, the handle grip 24 and throttle grip 41 as a grip provided on the handle pipe 14. Since the outer diameter of the head portion 63*b* of the fastening bolt 63 is formed large in this manner, the washer as required in the existing structure is no longer needed. Accordingly, it is possible to reduce the number of components, and thus reduce variation in the vibration isolating performance while reducing cost.

Further, the lock portion 63*f* includes the annular groove 63*k* as a notch portion formed in the shank portion 63*a*, and the groove width W as the width of the annular groove 63*k* in its axial direction is three times or more the thickness T of each claw portion 64*a* as an insertion portion which is formed in the coupling member 64 for being inserted in the annular groove 63*k*, the coupling member 64 being designed to couple the fastening bolt 63 and the inner weight 66 to each other. Since this lock portion 63*f* is formed in the fastening bolt 63, the width of the annular groove 63*k* for defining the lock portion 63*k* can be increased. Accordingly, the thickness of a cutting tool for forming the annular groove 63*k* can be increased and thus the cost of the cutting tool can be reduced. As a result, the handle weight 61 (see FIG. 4) can be made at a low cost.

The above embodiment merely represents one mode of the present invention, and any modifications and applications may be made without departing from the gist of the present invention.

In addition to motorcycles, the present invention is applicable, as appropriate, to any vehicles, such as bicycles, three-wheeled vehicles, and rough-terrain vehicles (ATVs), as long as they have a handle pipe.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A handle weight mounting structure for a straddle vehicle including a handle pipe with a handle weight which is supported by said handle pipe and configured to reduce vibrations of said handle pipe, said handle weight mounting structure comprising:

an outer weight provided on an end part of said handle pipe;
an inner weight supported inside said handle pipe via a rubber member; and
a fastening bolt provided to penetrate said outer weight for fixing said outer weight to said handle pipe, said fastening bolt includes a shank portion wherein an external thread portion to be screwed and joined to an inner face of said handle pipe is formed and a head portion which is formed on an end part of said shank portion for pressing said outer weight in an axial direction of said handle pipe;
a lock portion formed on said shank portion, said lock portion designed to couple said outer weight and said inner weight to each other;
said lock portion is provided on an end part of said external thread portion opposite from said head portion;
wherein an outer diameter of said shank portion of said fastening bolt on a side thereof close to said head portion is smaller than an outer diameter of said external thread portion of said shank portion; and
a space is defined between said shank portion and said outer weight.

2. The handle weight mounting structure for a straddle vehicle according to claim 1, wherein:
an outer diameter of said head portion is formed larger than an outer diameter of said handle pipe; and
said head portion is screwed and joined to said handle pipe while being brought in contact with an end part of said outer weight and an end part a knuckle guard which is designed to cover, from the front, a grip provided on said handle pipe.

3. The handle weight mounting structure for a straddle vehicle according to claim 2, wherein:
said lock portion includes a notch portion formed in said shank portion; and
a width of said notch portion in an axial direction thereof is three times or more a thickness of an insertion portion which is formed in a coupling member for being inserted in said notch portion, said coupling member being designed to couple said fastening bolt and said inner weight to each other.

4. The handle weight mounting structure for a straddle vehicle according to claim 1, wherein:
said lock portion includes a notch portion formed in said shank portion; and
a width of said notch portion in an axial direction thereof is three times or more a thickness of an insertion portion which is formed in a coupling member for being inserted in said notch portion, said coupling member being designed to couple said fastening bolt and said inner weight to each other.

5. A handle weight mounting structure for a straddle vehicle including a handle pipe with a handle weight supported by said handle pipe and configured to reduce vibrations of said handle pipe, said handle weight mounting structure comprising:
an outer weight provided on an end part of said handle pipe;
an inner weight supported inside said handle pipe via a rubber member; and
a fastening bolt provided to penetrate said outer weight for fixing said outer weight to said handle pipe, said fastening bolt including a shank portion wherein an external thread portion to be screwed and joined to an inner face of said handle pipe is formed and a head portion which is formed on an end part of said shank portion for pressing said outer weight in an axial direction of said handle pipe;
a lock portion formed on said shank portion, said lock portion being designed to couple said outer weight and said inner weight to each other;
said lock portion is provided on an end part of said external thread portion opposite from said head portion;
wherein an outer diameter of said shank portion of said fastening bolt on a side thereof close to said head portion is smaller than an outer diameter of said external thread portion of said shank portion; and
a space is defined between said shank portion and said outer weight.

6. The handle weight mounting structure for a straddle vehicle according to claim 5, wherein:
an outer diameter of said head portion is formed larger than an outer diameter of said handle pipe; and
said head portion is screwed and joined to said handle pipe while being brought in contact with an end part of said outer weight and an end part a knuckle guard which is designed to cover, from the front, a grip provided on said handle pipe.

7. The handle weight mounting structure for a straddle vehicle according to claim 5, wherein:
said lock portion includes a notch portion formed in said shank portion; and
a width of said notch portion in an axial direction thereof is three times or more a thickness of an insertion portion which is formed in a coupling member for being inserted in said notch portion, said coupling member being designed to couple said fastening bolt and said inner weight to each other.

8. The handle weight mounting structure for a straddle vehicle according to claim 6, wherein:
said lock portion includes a notch portion formed in said shank portion; and
a width of said notch portion in an axial direction thereof is three times or more a thickness of an insertion portion which is formed in a coupling member for being inserted in said notch portion, said coupling member being designed to couple said fastening bolt and said inner weight to each other.

9. A handle weight mounting structure for a straddle vehicle including a handle pipe with a handle weight operatively mounted on said handle pipe, said handle weight being configured to reduce vibrations of said handle pipe, said handle weight mounting structure comprising:
an outer weight mounted on an end part of said handle pipe;
an inner weight supported inside said handle pipe via a rubber member; and
a fastening bolt provided to penetrate said outer weight for fixing said outer weight to said handle pipe, said fastening bolt including a shank portion having an external thread portion to be screwed and joined to an inner face of said handle pipe and a head portion formed on an end part of said shank portion for pressing said outer weight in an axial direction of said handle pipe;
a lock portion formed on said shank portion, said lock portion being designed to couple said outer weight and said inner weight to each other, said lock portion being provided on an end part of said external thread portion opposite from said head portion;
wherein an outer diameter of said shank portion of said fastening bolt on a side thereof close to said head portion is smaller than an outer diameter of said external thread portion of said shank portion; and a space is defined between said shank portion and said outer weight.

10. The handle weight mounting structure for a straddle vehicle according to claim 9, wherein:

an outer diameter of said head portion is formed larger than an outer diameter of said handle pipe; and said head portion is screwed and joined to said handle pipe while being brought in contact with an end part of said outer weight and an end part a knuckle guard which is designed to cover, from the front, a grip provided on said handle pipe.

11. The handle weight mounting structure for a straddle vehicle according to claim 9, wherein:

said lock portion includes a notch portion formed in said shank portion; and a width of said notch portion in an axial direction thereof is three times or more a thickness of an insertion portion which is formed in a coupling member for being inserted in said notch portion, said coupling member being designed to couple said fastening bolt and said inner weight to each other.

* * * * *